United States Patent
Cao et al.

(10) Patent No.: US 9,031,024 B2
(45) Date of Patent: May 12, 2015

(54) RADIO RESOURCE MANAGEMENT FOR DISTRIBUTED CELLULAR SYSTEMS

(71) Applicants: Fengming Cao, Bristol (GB); Zhong Fan, Bristol (GB)

(72) Inventors: Fengming Cao, Bristol (GB); Zhong Fan, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 64 days.

(21) Appl. No.: 13/722,016

(22) Filed: Dec. 20, 2012

(65) Prior Publication Data

US 2013/0163539 A1 Jun. 27, 2013

(30) Foreign Application Priority Data

Dec. 23, 2011 (GB) .................................. 1122420.1

(51) Int. Cl.
*H04Q 7/00* (2006.01)
*H04W 72/08* (2009.01)
*H04W 72/12* (2009.01)

(52) U.S. Cl.
CPC .......... *H04W 72/085* (2013.01); *H04W 72/082* (2013.01); *H04W 72/1226* (2013.01)

(58) Field of Classification Search
None
See application file for complete search history.

(56) References Cited

U.S. PATENT DOCUMENTS 7,450,577 B2 * 11/2008 Johansson et al. ............ 370/386
8,229,443 B2 * 7/2012 Caire et al. .................... 455/446

FOREIGN PATENT DOCUMENTS

| JP | 2010-246114 | 10/2010 |
|---|---|---|
| JP | 2012-500522 | 1/2012 |
| WO | WO 2010/019613 A1 | 2/2010 |

OTHER PUBLICATIONS

Office Action issued Nov. 12, 2013 in Japanese Application No. 2012-280700 (With English Translation).

* cited by examiner

*Primary Examiner* — Duc C Ho
(74) *Attorney, Agent, or Firm* — Oblon, McClelland, Maier & Neustadt, L.L.P.

(57) ABSTRACT

In a network comprising user devices and signal notes, communication links are scheduled by identifying one or more active signal node/user device pairs, wherein each active pair comprises a signal node that is presently communicating with a respective active user device over a signal channel. Then, one or more inactive signal node/user device pairs is identified; each inactive pair comprises an inactive signal node that is not presently communicating over the signal channel and a potential user device that is capable of communicating with the inactive signal node over the signal channel. One of the inactive pairs is then identified which, when made into an active pair, will achieve the greatest total fairness criterion, the total fairness criterion being a sum of a fairness criterion for the potential user device in the inactive pair in question and a fairness criterion for each of the active user devices in the event that the respective inactive pair becomes an active pair. The fairness criterion for each user device is dependent on the transmission rate achievable between the user device and the signal node in its respective pair.

24 Claims, 7 Drawing Sheets

RADIO RESOURCE MANAGEMENT FOR DISTRIBUTED CELLULAR SYSTEMS

FIELD

Embodiments described herein relate generally to methods and systems for scheduling communication links between user devices and signal nodes in distributed cellular systems.

BACKGROUND

Distributed cellular systems, in which a central processing unit controls a number of distributed cells or remote radio units are becoming increasingly popular. Two examples of such systems are distributed antenna systems (DAS) and future cloud RAN (radio access network).

Distributed antenna systems (DAS) are being developed for the latest LTE (long term evolution) systems to improve cell coverage and system performance, by introducing a new network architecture in which multiple antennas are deployed over the cell in a distributed manner. In such an architecture, the antennas are connected to a central control hub unit (HU) normally with optical fibre and the antenna can be considered as radio remote units (RU), while the baseband signals are gathered and processed in the HU. As a result, the DAS can make use of spatial multiplexing gain and hence provide better system performance.

DAS can be deployed for different application scenarios. For example, the macro base station can be equipped with distributed antennas at different locations within a macro cell, instead of traditional co-located antennas. More recently, hybrid or heterogeneous networks are becoming more practical to address the coverage problem, offload the traffic, and improve user device experience. In such networks, different types of cells overlay the same area, for example, small pico cells sit within a macrocell. Normally these small cells are located indoors/inside a building and DAS are extremely useful for further improving the performance of these small cells. Therefore, DAS are becoming increasingly popular in buildings with such small cells.

Embodiments described herein may provide a novel resource allocation method for distributed cellular systems, where a central processing unit controls a number of distributed cells or remote radio units. These remote units can be, for example, RUs in a DAS architecture or remote radio units (RRUs) in the CRAN model.

BRIEF DESCRIPTION OF FIGURES

Embodiments of the invention will now be described by way of example with reference to the accompanying drawings in which.

DETAILED DESCRIPTION

Figure 1:
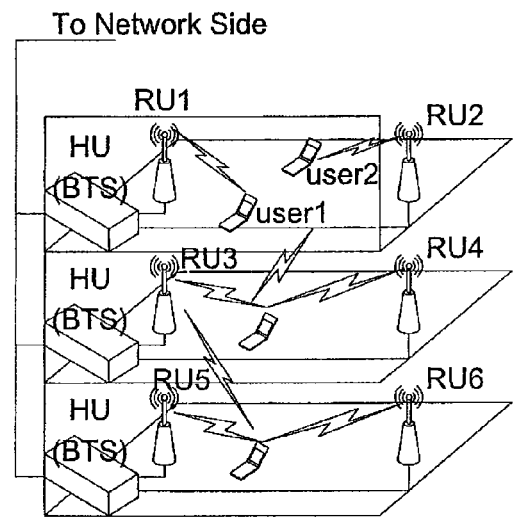
FIG. 1 is a schematic of a distributed antenna system deployed inside a building with small cells.

According to one embodiment a method is provided for scheduling communication links between user devices and signal nodes in a network. The method may comprise:

identifying one or more active signal node/user device pairs, wherein each active pair comprises a signal node that is presently communicating with a respective active user device over a signal channel, identifying one or more inactive signal node/user device pairs, wherein each inactive pair comprises an inactive signal node that is not presently communicating over the signal channel and a potential user device that is capable of communicating with the inactive signal node over the signal channel, and identifying one of the inactive pairs that, when made into an active pair, will achieve the greatest total fairness criterion, wherein the total fairness criterion is a sum of a fairness criterion for the potential user device in the inactive pair in question and a fairness criterion for each of the active user devices in the event that the respective inactive pair becomes an active pair, wherein the fairness criterion for each user device is determined based on the transmission rate achievable between the user device and the signal node in its respective pair.

In some embodiments, the fairness criterion for each user device is based on a ratio of the transmission rate achievable between the user device and the signal node in its respective pair, and the throughput previously achieved by the user device.

In some embodiments, the throughput previously achieved by each user device is measured from a predetermined point in time. For example, the throughput previously achieved may be the total throughput achieved by the user device over a predetermined number of scheduling epochs. In some embodiments, the throughput previously achieved by a user device may be calculated as the mean throughput achieved by the user device over a predetermined number of scheduling epochs. A scheduling epoch may correspond to a period between identifying an inactive pair to be made into an active pair and subsequently identifying a further inactive pair to be made into an active pair.

In some embodiments, the step of identifying the inactive pair that when made into an active pair will result in the greatest total fairness criterion includes:

calculating an achievable rate of transmission over the signal channel for each inactive pair, calculating an achievable rate of transmission over the signal channel for each active pair for each case in which a respective inactive pair becomes an active pair, calculating a proportional fair ratio for the potential user device in each inactive pair in the event that the respective inactive pair becomes an active pair, calculating a proportional fair ratio for each active user device for each case in which an inactive pair becomes an active pair, for each inactive pair, adding the proportional fair ratio calculated for the potential user device in the inactive pair to the proportional fair ratio calculated for each active user device in the event that the respective inactive pair becomes an active pair to obtain a potential total sum proportional fair ratio for the case in which the respective inactive pair becomes an active pair, and identifying the inactive pair that when active provides the largest potential total sum proportional fair ratio.

In some embodiments, the step of identifying the inactive pair that, when made into an active pair, will achieve the greatest total fairness criterion, includes taking into consideration interference generated by making each respective inactive pair into an active pair. For example, when determining whether an inactive pair is to be made into an active pair, a signal to noise ratio may be calculated for each presently active pair, where the noise includes interference generated by making the respective inactive pair into an active pair.

Some embodiments include a step of checking whether the greatest total fairness criterion is greater than the sum of the fairness criterions of the active user devices. In some embodiments, an inactive pair is only made into an active pair if the greatest total fairness criterion achieved by making the inactive pair into an active pair is greater than the sum of the fairness criterions of the active user devices.

In some embodiments, an inactive pair is only made into an active pair if the potential total sum proportional fair ratio for the respective inactive pair is greater than the sum of the proportional fair ratios of the active user devices.

Some embodiments include a step of checking whether any inactive pairs remain after an inactive pair has been made into an active pair and if so, repeating the earlier steps of the method. In the event that no inactive pairs remain after the inactive pair has been made into an active pair, a new signal channel may be selected, and the steps of the method may then be repeated for the new signal channel.

In some embodiments, active user device(s) are also treated as potential user device(s) of the inactive signal nodes. In the event that the inactive pair identified as achieving the greatest total fairness criterion includes a potential user device that is also an active user device in an active pair, the signal nodes in the respective active and inactive pairs may transmit cooperatively to the potential user device when the inactive pair becomes an active pair. For example, the signal transmitted from one signal node may be synchronised with the signal transmitted from the other signal node. For example, the signal transmitted from one signal node may be interleaved in time with the signal transmitted from the other signal node. The signal transmitted from the other signal node may, therefore, provide useful signal to the user device, rather than interference.

In some embodiments, the signal channel is a subcarrier signal in an OFDM-based system.

In some embodiments, the inactive pair identified as achieving the greatest total fairness criterion is only made into an active pair in the event that the fairness criterion calculated for each active user device remains above a threshold when the inactive pair is made into an active pair.

A second embodiment provides a system controller for a multi node communication system for scheduling communication links between signal nodes and user devices, the controller being configured to:

i) identify one or more active signal node/user device pairs, wherein each active pair comprises a signal node that is presently communicating with a respective active user device over a signal channel, ii) identify one or more inactive signal node/user device pairs, wherein each inactive pair comprises an inactive signal node that is not presently communicating over the signal channel and a potential user device that is capable of communicating with the inactive signal node over the signal channel, and iii) identify one of the inactive pairs that, when made into an active pair, will achieve the greatest total fairness criterion, wherein the total fairness criterion is a sum of a fairness criterion for the potential user device in the inactive pair in question and a fairness criterion for each of the active user devices in the event that the respective inactive pair becomes an active pair, wherein the fairness criterion for each user device is determined by the system controller based on the transmission rate achievable between the user device and the signal node in its respective pair.

In some embodiments, the fairness criterion for each user device is determined by the system controller based on a ratio of the transmission rate achievable between the user device and the signal node in its respective pair, and the throughput previously achieved by the user device.

In some embodiments, the system controller is configured to calculate the throughput previously achieved by the user device is calculated as the average throughput achieved over a predetermined number of scheduling epochs. Each scheduling epoch may correspond to a period between when the system controller identifies an inactive pair to be made into an active pair, and when the system controller subsequently identifies a further inactive pair to be made into an active pair.

In some embodiments, when identifying the inactive pair that will achieve the greatest total fairness criterion when made into an active pair, the controller is configured to:

iv) calculate an achievable rate of transmission over the signal channel for each inactive pair, v) calculate an achievable rate of transmission over the signal channel for each active pair for each case in which a respective inactive pair becomes an active pair, vi) calculate a proportional fair ratio for the potential user device in each inactive pair in the event that the respective inactive pair becomes an active pair, vii) calculate a proportional fair ratio for each active user device for each case in which an inactive pair becomes an active pair, viii) add the results obtained in steps vi) and vii) to obtain a potential total sum proportional fair ratio for each case in which a respective inactive pair becomes an active pair, and ix) identify the inactive pair that when active provides the largest total sum proportional fair ratio.

In some embodiments, the system controller is configured to take into consideration the effect of interference from the active pairs when calculating the achievable rate of transmission for each inactive pair.

In some embodiments, the system controller is configured to check whether the greatest total fairness criterion is greater than the sum of the fairness criterions of each of the active user devices and if so, to make the inactive pair identified in step iii) an active pair. In some embodiments, the system controller is configured to only make the inactive pair identified in step iii) into an active pair if the potential total sum proportional fair ratio for the respective inactive pair is greater than the sum of the proportional fair ratios of the active user devices.

In some embodiments, the controller is configured to check whether any inactive pairs remain after the inactive pair identified as achieving the greatest total fairness criterion has been made into an active pair and if so, to repeat steps i) to iii)).

In some embodiments, in the event that no inactive pairs remain after the inactive pair identified in step iii) has been made into an active pair, the system controller is configured to select a new signal channel and to repeat steps i) to iii) for the new signal channel.

In some embodiments, the controller is configured to include active user devices amongst the potential user devices of each inactive signal node.

In some embodiments, in the event that the inactive pair identified in step iii) includes a potential user device that is also an active user device in another active pair, the system controller is configured to control the signal nodes in the respective active and inactive pair to cooperatively transmit to the potential user device when the inactive pair becomes an active pair.

In some embodiments, the system controller is configured to make the inactive pair identified as achieving the greatest total fairness criterion into an active pair only in the event that the respective fairness criterion for each active user device remains above a threshold when the inactive pair is made into an active pair.

In some embodiments, the system controller may be comprised within a system including a plurality of signal nodes that are controllable by the system controller. In some embodiments, the system is an OFDM-based system.

In some embodiments, the fairness criterion for a potential user device in an inactive pair is calculated as being the rate of transmission achievable between the potential user device and the respective inactive node.

A third embodiment of the present invention provides a computer program product stored on a computer-readable media comprising instructions operative to cause a system controller to execute a method according to the first embodiment of the present invention.

FIG. 1 illustrates an example of DAS in-building deployment, in which there are 3 floors and each floor has one hub unit (HU) connecting with 2 radio remote units (RUs). As shown in FIG. 1, different RUs within a HU can use the same frequency for different user devices, which actually reuses the frequency and hence improves the spectrum efficiency.

Figure 2:
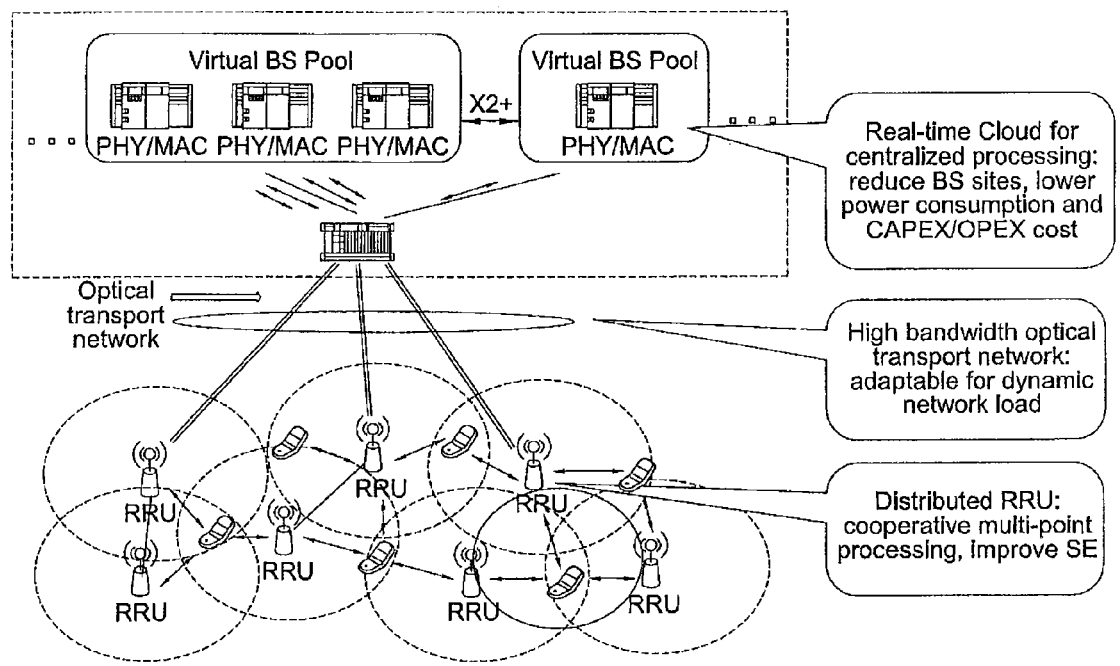
FIG. 2 shows a diagram of a CRAN Architecture.

In addition to DAS, a new cellular architecture called Cloud Radio Access Network (CRAN) is gaining increasing popularity among major network operators and equipment vendors (e.g. China Mobile, Intel, Huawei, Ericsson). Thanks to the rapid development in computer networks and multi-core processors, real-time cloud computing with centralized processing is becoming a reality. Cloud Computing refers to both the applications delivered as services over the Internet and the hardware and systems software in the data centres that provide those services. There have been proposals (e.g. from Nokia) of offloading computation at mobile clients to the cloud so as to save energy for mobile devices. Recently, China Mobile, IBM, and a few other major ICT companies (e.g. Intel, Huawei, Ericsson) proposed to move CoMP (Coordinated Multipoint Transmission) in LTE one step further towards the so-called Cloud Radio Access Network (CRAN) where clusters of base stations are connected through a Common Public Radio Interface via high speed optical transport networks. Such network architecture moves the high computational complexity to the central processing cloud, and allows low power consumption at the base stations—a way towards green radio. A diagram of the CRAN architecture is shown in FIG. 2.

CRAN represents a paradigm shift in cellular network architecture (which has remained largely the same for the past 30 years). As signal processing moves to a powerful cloud, global knowledge of the network conditions and user device traffic may become available. Better coordination of base stations, easier control signalling and better load balancing may therefore be achieved.

Thus, distributed cellular systems offer many advantages. Nonetheless, these types of systems pose challenges as well as opportunities. For example, while DAS brings benefit to in-building small cells, a major problem is interference, especially inter-RU interference within a HU. Referring to FIG. 1, for example, remote radio unit RU1 communicating with its user device1 will cause interference to user device2, who is communicating with remote radio unit RU2. Conversely, RU2 will also cause interference to user device1. In regard to the CRAN architecture, many of the existing algorithms on resource allocation and interference management may need to be re-examined considering new constraints, e.g. finite capacity and latency of the cloud links, real-time processing requirements.

Figure 3:
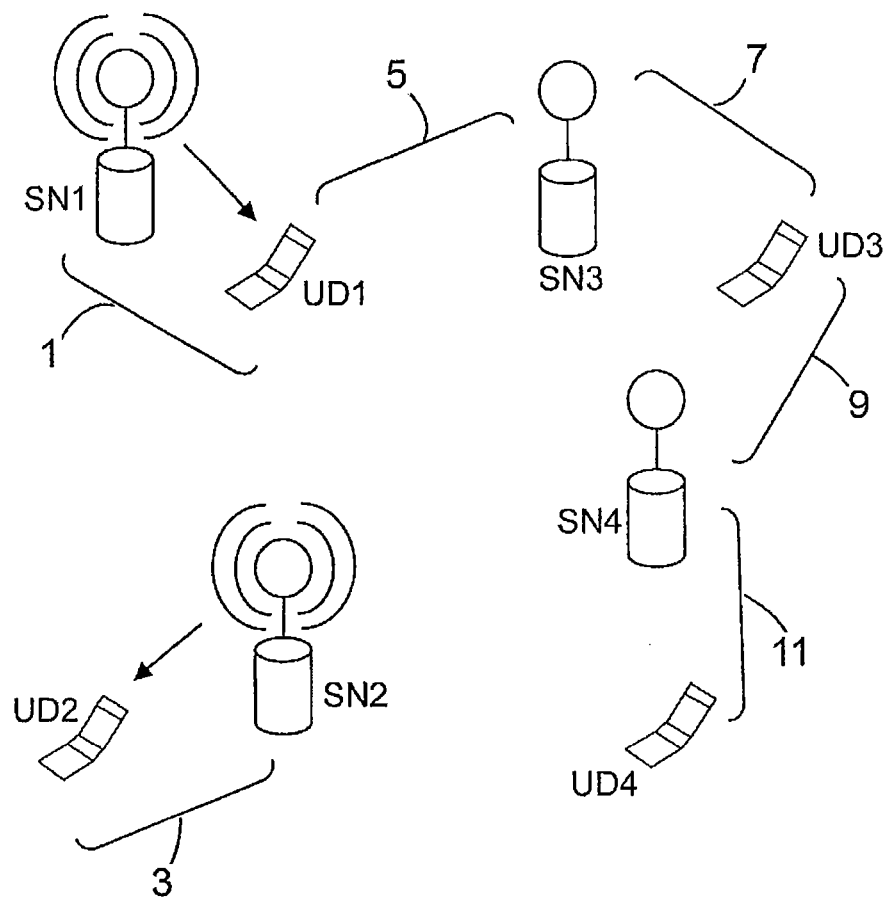
FIG. 3 shows an arrangement of signal nodes and user devices in which embodiments described herein may be employed.

FIG. 3 shows an example of a distributed cellular system comprising inactive and active pairs of signal nodes and user devices. In the system shown, signal nodes SN1, SN2, SN3, and SN4 each form antennas that are deployed over a cell in a distributed manner. The antennas are connected to a central control hub unit (not shown in FIG. 3). Also shown in FIG. 3 are user devices UD1, UD2, UD3 and UD4. User devices UD1 to UD4 may, for example, be mobile phone devices owned by different subscribers to a network.

Signal node SN1 is an active signal node that is presently transmitting information to user device UD1 over a signal channel. Together, signal node SN1 and UD1 form an active pair 1. Similarly, signal node SN2 and user device UD2 form a second active pair 3. Signal node SN3 is presently inactive, as it is not currently transmitting to any one of the user devices. Similarly, signal node SN4 is also not transmitting at the present time.

SN3 has the potential to transmit to either one of user devices UD1 or UD3. Thus, SN3 and UD1 together form an inactive pair 5, and SN3 and UD3 form another inactive pair 7. In a similar fashion, SN4 and UD3 form an inactive pair and so do SN4 and UD4. In theory, SN3 is free to transmit to either UD1 or UD3 over the same signal channel as SN1, and SN4 is free to transmit to either UD3 or UD4 over the same signal channel.

Embodiments of the present invention provide a means for establishing which of the presently inactive signal nodes shall next be activated to transmit on the signal channel, and which user device shall receive transmissions from that signal node. When selecting which one of the inactive nodes to activate, and which user device to transmit to, the net effect on the transmission rate of all presently active pairs may be considered. For example, the transmission rate achieved by active pairs of signal nodes and user devices may be reduced as a result of interference introduced when activating a new pair. At the same time, it may be necessary to balance this reduction in transmission rate in presently active pairs against the need to ensure that other, presently inactive, user devices are still able to achieve a minimum degree of throughput.

In some embodiments, proportional fair scheduling is used to establish a fairness criterion for respective user devices. The proportional fair scheduling can be expressed to maximize the sum of logarithmic average user device throughput as $$P^* = \underset{P}{\operatorname{argmax}} \sum_{\forall i} \log \overline{R}_{i,k}^{(P)} \quad (1)$$

where $\overline{R}_{i,k}^{(P)}$ is the average throughput of the $i^{th}$ user device over the last k scheduling epochs.

It has been proved that the proportional fair optimization for multicarrier or OFDM-based systems can be presented as:

$$\max_{x(t)} \prod_{\forall i} \left(1 + \frac{\sum_{\forall n} x_{i,n}^{(t)} r_{i,n}^{(t)}}{(k-1)\overline{R}_{i,k}^{(t-1)}}\right) \quad (2)$$

Subject to $$\sum_{\forall i} x_{i,n}^{(t)} \leq 1$$

where $x_{i,n}^{(t)}$ is the binary allocation variable that is one if the scheduler assigns the $n^{th}$ signal channel to the $i^{th}$ user device, otherwise zero. $r_{i,n}^{(t)}$ is the instantaneous achievable throughput of the $i^{th}$ user device on the $n^{th}$ signal channel.

The optimal solution for (2) is highly complicated since it has to exhaustively search the maximum among all the possible combinations and the following alternative linear optimization for proportional fair is widely used:

$$\max_{x(t)} \sum_{\forall i} \sum_{\forall n} \frac{x_{i,n}^{(t)} r_{i,n}^{(t)}}{\overline{R}_{i,k}^{(t-1)}} \quad (3)$$

Subject to:

$$\sum_{\forall i} x_{i,n}^{(t)} \leq 1$$

The widely accepted solution for (3) is the carrier-wise proportional solution:

$$i_n^{*(t)} = \underset{i}{\operatorname{argmax}} \frac{r_{i,n}^{(t)}}{\overline{R}_{i,k}^{(t-1)}} \quad (4)$$

The basic idea of carrier-wise proportional solution in (4) is to assign the user devices over the signal channels one by one. For each signal channel, the user device that has the maximal proportional fair ratio $$\frac{r_{i,n}^{(t)}}{\overline{R}_{i,k}^{(t-1)}}$$

as in (4) will be assigned.

CRAN and DAS are very similar, since in both architectures there is a central control unit and a number of RUs (cf. FIG. 1 and FIG. 2). In the following, DAS is used to explain an algorithm for allocating signal channels to respective user devices. The same algorithm can be easily applied to CRAN systems too.

In the in-building DAS, the HU is a central control unit and has all the channel status information (CSI) of the user devices of its RUs, which makes it possible for fast multi-RU dynamic resource allocation/scheduling to reduce the interference. Furthermore, the HU can coordinate the transmissions among the RUs and sometimes enable multiple RUs to cooperatively transmit to the user devices to eliminate interference. To this end, embodiments of the present invention utilise a new radio resource allocation method: joint proportional fair scheduling with cooperative transmission for OFDM-based distributed cellular systems.

The system-wide proportional fair optimization for a DAS can be presented as $$\max_{x(t)} \sum_{\forall c} \sum_{\forall i \in S_c} \sum_{\forall n} \frac{x_{c,i,n}^{(t)} r_{c,i,n}^{(t)}}{\overline{R}_{c,i,k}^{(t-1)}} \quad (5)$$

Subject to:

$$\sum_{\forall i \in S_c} x_{c,i,n}^{(t)} \leq 1$$

where $s_c$ is the set of user devices served by the $c^{th}$ RU. $x_{c,i,n}^{(t)}$ is the binary allocation variable that is one if scheduler assigns the $n^{th}$ signal channel to the $i^{th}$ user device in the $c^{th}$ RU, otherwise zero. $r_{c,i,n}^{(t)}$ is the instantaneous achievable rate of the $i^{th}$ user device on the $n^{th}$ signal channel in the $c^{th}$ RU. $\overline{R}_{c,i,k}^{(P)}$ is the average throughput of the $i^{th}$ user device of the $c^{th}$ RU over the last k scheduling epochs. The constraint means each signal channel can be assigned to only one user device within a RU.

It should be noted that the achievable rate of a user device in a given RU depends on not only the signal from the given RU, but also the interference from other RUs, which makes the optimization in (5) more difficult. Finding the optimal solution for (5) is NP-hard and therefore it makes sense to find a practical, suboptimal solution.

In some embodiments, a signal channel-wise suboptimal solution is disclosed to assign the user devices over the signal channels one by one. For each signal channel n, the user devices among the RUs are assigned to maximize the sum of proportional fair ratio as in (6), subject to the constraint that there is at most only one user device assigned to each RU.

$$\max_{x(t)} \sum_{\forall c} \sum_{\forall i \in S_c} \frac{x_{c,i,n}^{(t)} r_{c,i,n}^{(t)}}{\overline{R}_{c,i,k}^{(t-1)}} \quad (6)$$

Subject to $$\sum_{\forall i \in S_c} x_{c,i,n}^{(t)} \leq 1$$

To maximize the sum of proportional fair ratio at each signal channel as in (6), an iterative method is proposed to allocate user devices to the signal channel in a greedy fashion:

at each iteration, among the unselected user devices of unselected RUs (i.e. potential user devices in inactive pairs), the user device with the highest positive contribution to the sum of proportional fair ratio of previously selected user devices (i.e. active devices) will be selected. Then the next iteration will be carried out until either every RU is assigned a user device or there is no further positive contribution to the sum of proportional fair ratio. The whole procedure includes the following steps.

Denote $C_n$ the set of RUs having user devices selected at signal channel n, and name the RUs in the set as selected RUs. $U_n$ is the set of selected user devices for signal channel n. Hence $\{C_n, U_n\}$ is a pair set of the selected RUs and user devices (i.e. the set of active pairs). $\Omega$ is the sum of the proportional fair ratio of current selected (i.e. active) user devices. K is the set of total RUs. $\overline{C}_n$ is the set of unselected RUs without any user device selected and $\overline{C}_n = K \lambda C_n$. $\phi$ is a null set. $S_c$ is the set of user devices in the $c^{th}$ RU. $|K|$ and $|C_n|$ are the cardinality of the set K and $C_n$ respectively. Let $C=|K|$ and $m=|C_n|$.

Without loss of generality, assume there are total K user devices and the set of total user devices is $$S \equiv \{1, 2, \ldots, K\} = \bigcup_c S_c.$$

For each signal channel n, the iterative procedure can be described as follows:

Step 1: Initialization $C_n = \phi;$ $U_n = \phi;$ $\{C_n, U_n\} = \{\phi, \phi\}$ $\overline{C}_n = \phi$ $\Omega = 0$ Step 2: For each unselected RU $c \in \overline{C}_n$ a) Calculate the achievable rate $r_{c,i,n}^{(t)}$ for $\forall i \in S_c$, with interferences from the RUs of the set q, (i.e. interference from the active user devices).

b) Calculate the achievable rate $r_{c',j,n \leftarrow c}^{(t)}$ for the previously selected user devices (i.e. the active devices) $\forall \{c',j\} \in \{C_n, U_n\}$ assuming that a potential user device in the RU $c \in \overline{C}_n$ is selected at the $n^{th}$ signal channel, hence providing extra interference.

c) Calculate the sum of proportional fair ratio of previously selected user devices (active user devices) when assuming the potential user device $i \in S_c$ is added to the list of active user devices, as given by the expression below:

$$\sum_{\{c',j\} \in \{C_n, U_n\}} \frac{r_{c',j,n \leftarrow c}^{(t)}}{R_{c',j,k}^{(t-1)}}$$

Then calculate the total sum of proportional fair ratio due to the added user device $i \in S_c$ as $$T_{c,i} = \frac{r_{c,i,n}^{(t)}}{R_{c,i,k}^{(t-1)}} + \sum_{\{c',j\} \in \{C_n, U_n\}} \frac{r_{c',j,n \leftarrow c}^{(t)}}{R_{c',j,k}^{(t-1)}}.$$

d) Find the potential user device among the user devices of unselected RUs (c*,i*) that has the highest contribution to the sum of proportional fair ratio as $T_{c^*,i^*}$ as $$(c^*, i^*) = \underset{\substack{c \in \overline{C}_n \\ i \in S_c}}{\operatorname{argmax}} (T_{c,i} - \Omega).$$

Figure 4:
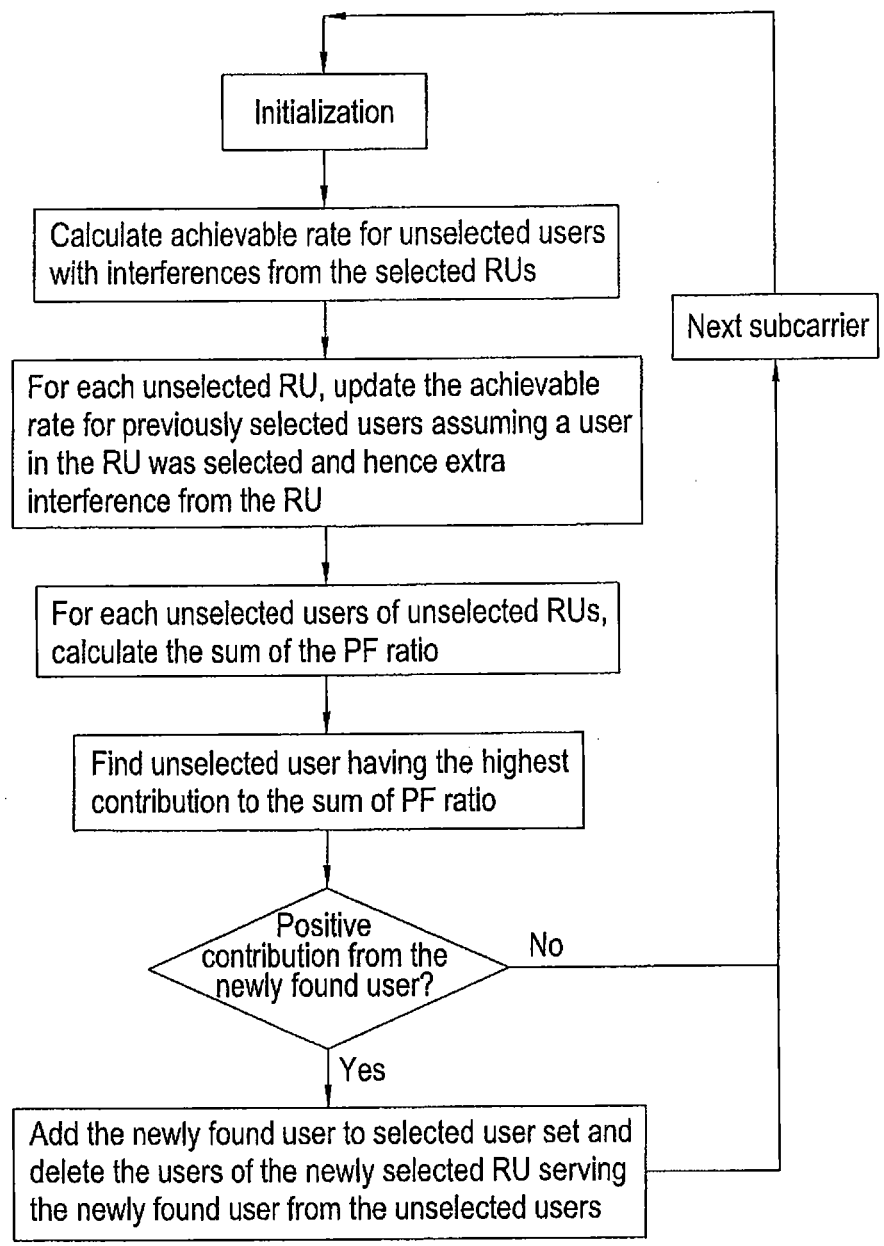
FIG. 4 is a flow chart of steps involved in a scheduling procedure according to a described embodiment.

Step 3: Check whether the contribution to the sum of proportional fair ratio is positive. If the contribution to the sum of proportional fair ratio is positive, i.e. $T_{c^*,i^*} > \Omega$, then:

a) Set the sum of the proportional fair ratio of current selected user devices (active user devices) as $\Omega = T_{c^*,i^*}$.
b) Add the newly selected user device to the set of active user devices as $U_n = U_n \cup i^*$.
c) Add the RU serving the newly selected user device to the set of selected RUs $C_n = C_n \cup c^*$.
d) Update the set of unselected RU as $\overline{C}_n = K \lambda C_n$
e) Set $x_{c^*,i^*,n}^{(t)} = 1$ Step 4: Check whether the set of unselected RU is empty (i.e. check if there are any inactive pairs remaining). If it is not empty, repeat steps 2 and 3, otherwise, proceed to the next signal channel. The above procedure is shown in FIG. 4.

In a DAS, the cell edge user devices of RUs may experience severe interference. To help ensure this does not happen, the above resource allocation method can be slightly revised to further mitigate the multi-RU interference. For example, in some embodiments, in step 2, the equation used to determine which of the potential user devices is to be made into an active user device in each iteration can be changed to ensure that the presently active user devices do not suffer a degraded performance as a result of the inactive pair becoming an active pair.

In some embodiments, the user device among the potential user devices of inactive RUs (c*,i*) that has the highest contribution to the sum of proportional fair ratio $T_{c^*,i^*}$ $$(c^*, i^*) = \underset{\substack{c \in \overline{C}_n \\ i \in S_c}}{\operatorname{argmax}} (T_{c,i} - \Omega).$$

is only made into an active user in the event that:

$$r_{c',j,n \leftarrow c}^{(t)} > \gamma \forall \{c',j\} \in \{C_n, U_n\}$$

where $\gamma$ is the minimal QoS requirement or data rate with minimal MCS support. In other words, where the effect of making an inactive pair into an active pair is to cause the transmission rate achievable for presently active users to fall below a threshold level, the inactive pair is not made into an active pair.

According to the DAS architecture, each RU is physically an analogue antenna array and is connected directly with the HU unit. The HU can have all the CQI information from all the user devices of its RUs and acts as a central control unit. This architecture makes cooperative transmission implementable.

Figure 5:
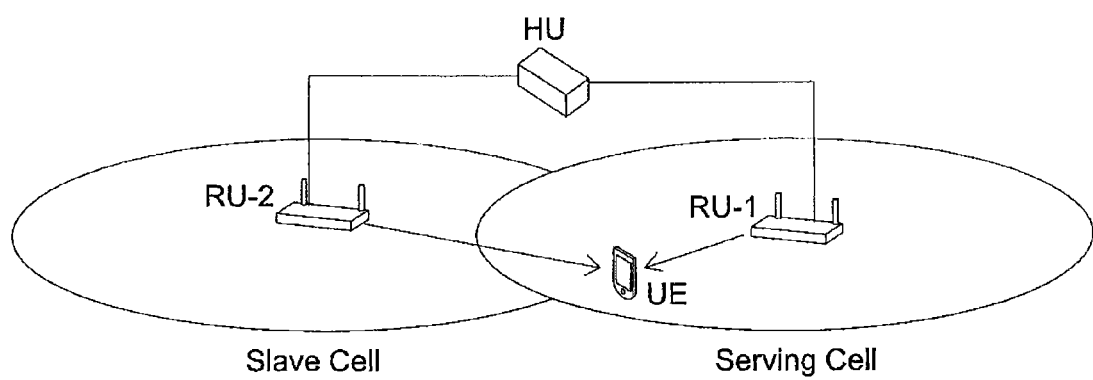
FIG. 5 shows a distributed antenna system using cooperative transmission according to a described embodiment.

To illustrate the cooperative transmission concept, in FIG. 5, a user device UE sits in the cell of RU-1, but suffers from the interference from RU-2. Where cooperative transmission is used, the signal transmitted from RU-2 to the user device UE can provide a useful addition to the signal transmitted from RU-1 to the user device, rather than the two signals simply interfering with one another. For convenience, the original RU that serves the user device UE may be called the serving RU and the RU that cooperatively transmits to the user device UE is called the user device UE's slave RU.

The above carrier-wise resource allocation method can be revised to integrate cooperative transmission as follows. In some embodiments, for each scheduling event, the previously selected user devices (i.e. the active users) may also serve as potential user devices in inactive pairs. As before, the inactive pair that offers the highest positive contribution to the sum of proportional fair ratio of previously selected (i.e. active) user devices will be selected to become an active pair. If the newly selected user device is a previously selected (active) user device, the user device will then be in communication with 2 signal nodes, which will transmit to that user device in a cooperative manner. Then the next iteration will be carried out until either every inactive RU has been assigned a user device, or there is no further positive contribution to the sum of the proportional fair ratio. The whole procedure includes the following steps:

For each signal channel n the iterative procedure can be described as follows:

Step 1: Initialization $C_n = \phi$ $U_n = \phi$ $\{C_n, U_n\} = \{\phi, \phi\}$ $\overline{C}_n = \phi$ $\Omega = 0$ Step 2: For each unselected RU $c \in \overline{C}_n$ a) Calculate the achievable rate $r_{c,i,n}^{(t)}$ for $\forall i \in S_c$, with interferences from the selected RUs of the set $C_n$ (i.e. interference from the active user devices).

b) Calculate the achievable rate $r_{c',j,n \leftarrow c}^{(t)}$ for previously selected (active) user devices $\forall \{c',j\} \in \{C_n, U_n\}$, assuming that a potential user device of the RU $c \in \overline{C}_n$ is selected at the $n^{th}$ signal channel, hence providing extra interference.

c) Calculate the achievable rate $r_{c',j,n \leftarrow +c}^{(t)}$ for previously selected (active) user devices $\forall \{c',j\} \in \{C_n, U_n\}$ assuming that the signal node RU c cooperatively transmits to a user device that is already part of an active pair $\{c',j\} \in \{C_n, U_n\}$.

d) Calculate the total sum of proportional fair ratio as:

$$T_{c,g} = \frac{r_{c,g,n}^{(t)}}{\overline{R}_{c,g,k}^{(t-1)}} + \sum_{\{c',j\} \in \{C_n, U_n\}} \frac{r_{c',j,n \leftarrow c}^{(t)}}{\overline{R}_{c',j,k}^{(t-1)}}, \text{ for } g \in S_c$$

assuming that the user device for the unselected RU c (i.e. $g \in S_c$) is added.

e) Calculate the total sum of proportional fair ratio as $$T_{c,g} = \frac{r_{c,g,n \leftarrow +c}^{(t)}}{\overline{R}_{c,g,k}^{(t-1)}} + \sum_{\substack{\{c',j\} \in \{C_n, U_n\} \\ j \neq g}} \frac{r_{c',j,n \leftarrow +c}^{(t)}}{\overline{R}_{c',j,k}^{(t-1)}}, \text{ for } \{c'', g\} \in \{C_n, U_n\},$$

assuming that the signal node RU c cooperatively transmits to the previously selected (active) user device, i.e. $\{c',g\} \in \{C_n, U_n\}$.

f) Find the potential user device that has the highest contribution to the sum of proportional fair ratio as $$(c^*, g^*) = \arg \max_{\substack{c \in \overline{C}_n \\ g \in S_c \cup U_n}} (T_{c,g} - \Omega)$$

Figure 6:
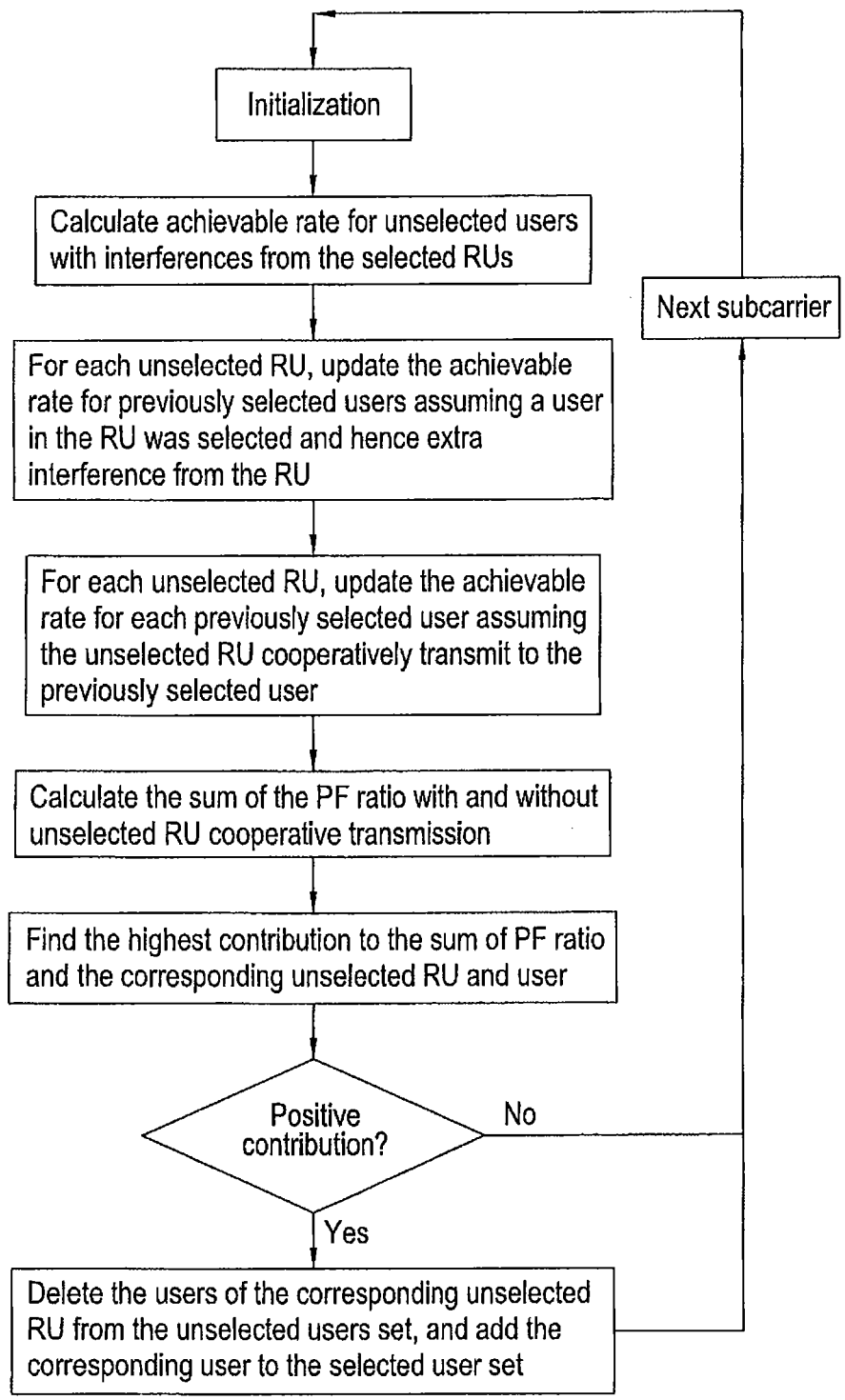
FIG. 6 shows a flow chart of steps involved in a scheduling procedure according to a described embodiment.
Figure 7:
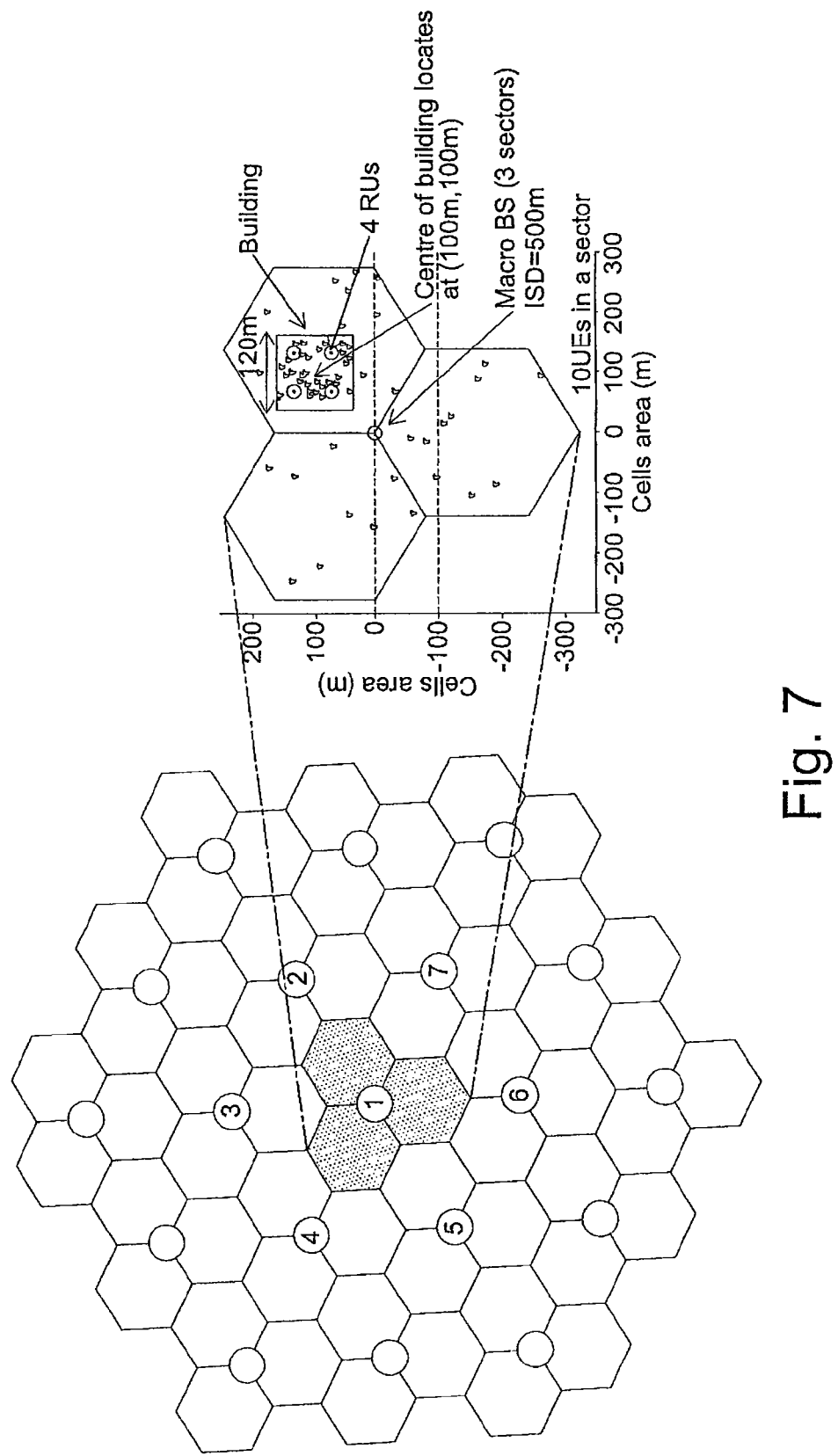
FIG. 7 shows a network layout used to simulate the averaged RU throughput and averaged throughput of user devices achieved when using a described embodiment.
Figure 8:
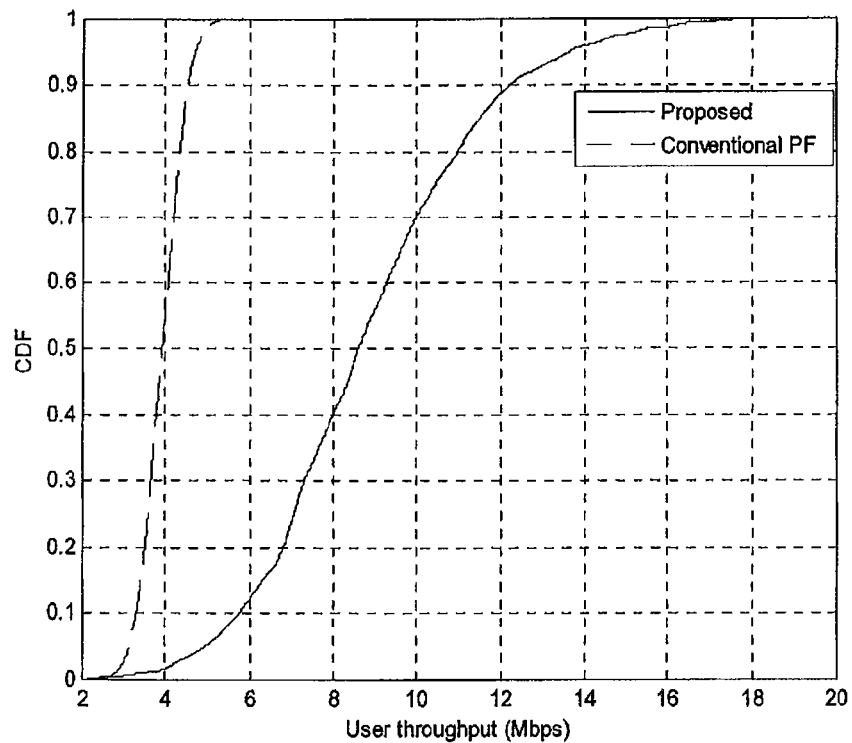
FIG. 8 shows a comparison between the average user throughput achieved when employing a scheduling method according to a described embodiment, and when using a conventional scheduling method.
Figure 9:
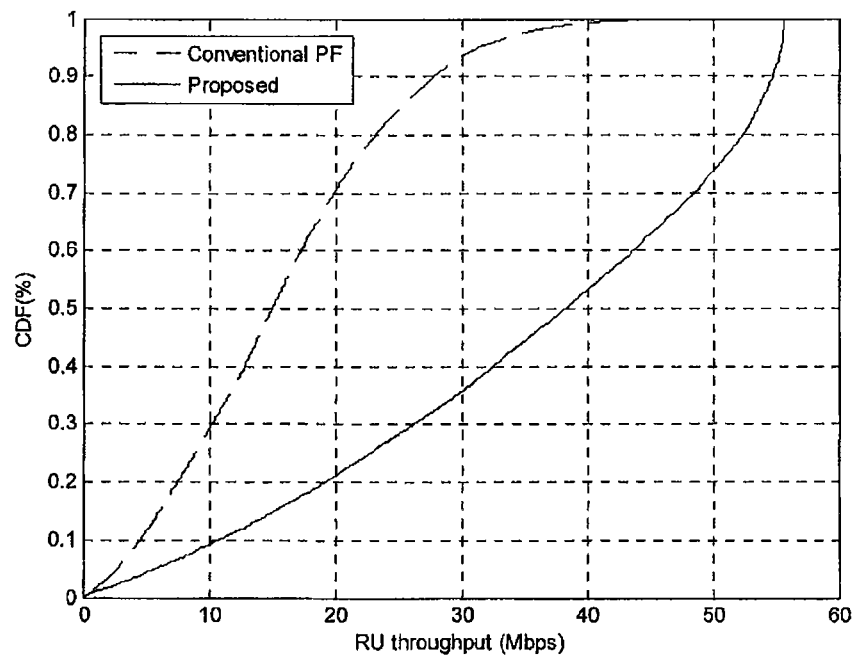
FIG. 9 shows a comparison between the average RU throughput achieved when employing a scheduling method according to a described embodiment, and when using a conventional scheduling method.

Step 3. Check whether the contribution to the sum of proportional fair ratio is positive. If the contribution to the sum of proportional fair ratio is positive i.e. $T_{c^*,g^*} > \Omega$, then:

a) Set the sum of the proportional fair ratio of current selected user devices (active user devices) as $\Omega = T_{c^*,g^*}$
b) Add the newly selected user device to the set of selected user devices (active user devices) as $U_n = U_n \cup g^*$
c) Add the RU serving the newly selected user device to the set of selected RUs $C_n = C_n \cup c^*$
c) Add the RU serving the newly selected user device to the set of selected RUs $C_n = C_n \cup c^*$
d) Update the set of unselected RU as $\overline{C}_n = K \setminus C_n$
e) Set $x_{c^*,g^*,n}^{(t)} = 1$ Step 4: Check whether the set of unselected RU is empty (i.e. check if there are any inactive pairs remaining). If it is not empty, repeat steps 2 and 3, otherwise, proceed to the next signal channel. The procedure is shown in FIG. 6.

Each signal channel may be a subcarrier, but is not limited to the subchannel or chunk level, where the subchannel or chunk is a group of multiple subcarriers.

The invention claimed is:

1. A method for scheduling communication links between user devices and signal nodes in a network, the method comprising:
   i) identifying one or more active signal node/user device pairs, wherein each active pair comprises a signal node that is presently communicating with a respective active user device over a signal channel,
   ii) identifying one or more inactive signal node/user device pairs, wherein each inactive pair comprises an inactive signal node that is not presently communicating over the signal channel and a potential user device that is capable of communicating with the inactive signal node over the signal channel, and
   iii) identifying one of the inactive pairs that, when made into an active pair, will achieve the greatest total fairness criterion, wherein the total fairness criterion is a sum of a fairness criterion for the potential user device in the inactive pair in question and a fairness criterion for each of the active user devices in the event that the identified one of the inactive pairs becomes an active pair,
   wherein the fairness criterion for each user device is dependent on the transmission rate achievable between the user device and the signal node in its respective pair.

2. A method according to claim 1, wherein the fairness criterion is determined based on a ratio of the transmission rate achievable between the user device and the signal node in its respective pair, and the throughput previously achieved by the user device.

3. A method according to claim 2, wherein the step of identifying the inactive pair that when made into an active pair will result in the greatest total fairness criterion includes:
   iv) calculating an achievable rate of transmission over the signal channel for each inactive pair,
   v) calculating an achievable rate of transmission over the signal channel for each active pair for each case in which a respective inactive pair becomes an active pair, vi) calculating a proportional fair ratio for the potential user device in each inactive pair in the event that the respective inactive pair becomes an active pair, vii) calculating a proportional fair ratio for each active user device for each case in which an inactive pair becomes an active pair, viii) adding the results obtained in steps vi) and vii) to obtain a potential total sum proportional fair ratio for each case in which a respective inactive pair becomes an active pair, ix) identifying the inactive pair that when active provides the largest total sum proportional fair ratio.

4. A method according to claim 3, wherein the step of calculating the achievable rate of transmission for each inactive pair takes into consideration the effect of interference from the active pairs.

5. A method according to claim 3, wherein the inactive pair identified in step iii) is only made into an active pair in the event that the fairness criterion for each respective active user device remains above a threshold when the inactive pair is made into an active pair.

6. A method according to claim 1, further comprising the step of checking whether the greatest fairness criterion is greater than the sum of the fairness criterion of each of the active user devices and if so making the inactive pair identified in step iii an active pair.

7. A method according to claim 1, further comprising checking whether any inactive pairs remain after the inactive pair identified in step iii) has been made into an active pair and if so, repeating steps i) to iii) of the method.

8. A method according to claim 7, wherein in the event that no inactive pairs remain after the inactive pair identified in step iii) has been made into an active pair, the method comprises selecting a new signal channel and repeating steps i) to iii) for the new signal channel.

9. A method according to claim 1, wherein an active user device is also a potential user device of an inactive signal node.

10. A method according to claim 9, wherein in the event that the inactive pair identified in step iii) includes a potential user device that is also an active user device in another active pair, the signal nodes in the respective active and inactive pair transmit cooperatively to the potential user device when the inactive pair becomes an active pair.

11. A method according to claim 1, wherein the signal channel is a subcarrier signal in an OFDM-based system.

12. A system controller for a multi node communication system for scheduling communication links between signal nodes and user devices, the controller being configured to:

i) identify one or more active signal node/user device pairs, wherein each active pair comprises a signal node that is presently communicating with a respective active user device over a signal channel, ii) identify one or more inactive signal node/user device pairs, wherein each inactive pair comprises an inactive signal node that is not presently communicating over the signal channel and a potential user device that is capable of communicating with the inactive signal node over the signal channel, and iii) identify one of the inactive pairs that, when made into an active pair, will achieve the greatest total fairness criterion, wherein the total fairness criterion is a sum of a fairness criterion for the potential user device in the inactive pair in question and a fairness criterion for each of the active user devices in the event that the identified one of the inactive pairs becomes an active pair, wherein the fairness criterion for each user device is determined by the system controller based on the transmission rate achievable between the user device and the signal node in its respective pair.

13. A system controller according to claim 12, wherein the fairness criterion for each user device is determined by the system controller based on a ratio of the transmission rate achievable between the user device and the signal node in its respective pair, and the throughput previously achieved by the user device.

14. A system controller according to claim 13, wherein when identifying the inactive pair that will achieve the greatest total fairness criterion when made into an active pair, the controller is configured to:

iv) calculate an achievable rate of transmission over the signal channel for each inactive pair, v) calculate an achievable rate of transmission over the signal channel for each active pair for each case in which a respective inactive pair becomes an active pair, vi) calculate a proportional fair ratio for the potential user device in each inactive pair in the event that the respective inactive pair becomes an active pair, vii) calculate a proportional fair ratio for each active user device for each case in which an inactive pair becomes an active pair, viii) add the results obtained in steps vi) and vii) to obtain a potential total sum proportional fair ratio for each case in which a respective inactive pair becomes an active pair, and ix) identify the inactive pair that when active provides the largest total sum proportional fair ratio.

15. A system controller according to claim 14, wherein the system controller is configured to take into consideration the effect of interference from the active pairs when calculating the achievable rate of transmission for each inactive pair.

16. A system controller according to claim 12, wherein the controller is configured to check whether the greatest total fairness criterion is greater than the sum of the fairness criterions of each of the active user devices and if so, to make the inactive pair identified in step iii) an active pair.

17. A system controller according to claim 12, wherein the controller is configured to check whether any inactive pairs remain after the inactive pair identified as achieving the greatest total fairness criterion has been made into an active pair and if so, to repeat steps i) to iii).

18. A system controller according to claim 12, wherein in the event that no inactive pairs remain after the inactive pair identified in step iii) has been made into an active pair, the system controller is configured to select a new signal channel and to repeat steps i) to iii) for the new signal channel.

19. A system controller according to claim 12, wherein the controller is configured to include active user devices amongst the potential user devices of each inactive signal node.

20. A system controller according to claim 19, wherein in the event that the inactive pair identified in step iii) includes a potential user device that is also an active user device in another active pair, the system controller is configured to control the signal nodes in the respective active and inactive pair to cooperatively transmit to the potential user device when the inactive pair becomes an active pair.

21. A system controller method according to claim 12, wherein the system controller is configured to make the inactive pair identified as achieving the greatest total fairness criterion into an active pair only in the event that the fairness criterion for each respective active user device remains above a threshold when the inactive pair is made into an active pair.

22. A system comprising a system controller according to claim 12 and a plurality of signal nodes, controllable by the system controller.

23. A system according to claim 22, wherein the system is an OFDM-based system.

24. A non transitory computer program product stored on a computer-readable media comprising instructions operative to cause a system controller to execute a method according to claim 1.

* * * * *